(12) United States Patent
Doebelin Esquitino et al.

(10) Patent No.: US 11,957,146 B2
(45) Date of Patent: Apr. 16, 2024

(54) AMORPHOUS PARTICLES FOR REDUCING SUGAR IN FOOD

(71) Applicant: SOCIETE DES PRODUITS NESTLE S.A., Vevey (CH)

(72) Inventors: Julien Doebelin Esquitino, Lausanne (CH); Laurent Forny, Lausanne (CH); Benjamin Jean Didier Le Reverend, Kirkwood, MO (US); Vincent Daniel Maurice Meunier, Epalinges (CH)

(73) Assignee: Societe des Produits Nestle S.A., Vevey (CH)

( * ) Notice: Subject to any disclaimer, the term of this patent is extended or adjusted under 35 U.S.C. 154(b) by 287 days.

(21) Appl. No.: 17/299,903

(22) PCT Filed: Dec. 6, 2019

(86) PCT No.: PCT/EP2019/084037
§ 371 (c)(1),
(2) Date: Jun. 4, 2021

(87) PCT Pub. No.: WO2020/115303
PCT Pub. Date: Jun. 11, 2020

(65) Prior Publication Data
US 2022/0022512 A1   Jan. 27, 2022

(30) Foreign Application Priority Data
Dec. 6, 2018 (EP) .................... 18210742

(51) Int. Cl.
*A23L 33/125* (2016.01)
*A23G 1/40* (2006.01)
*A23G 1/46* (2006.01)
*A23G 1/52* (2006.01)
*A23L 5/30* (2016.01)

(52) U.S. Cl.
CPC .............. *A23L 33/125* (2016.08); *A23G 1/40* (2013.01); *A23G 1/46* (2013.01); *A23G 1/52* (2013.01); *A23L 5/30* (2016.08)

(58) Field of Classification Search
None
See application file for complete search history.

(56) References Cited

U.S. PATENT DOCUMENTS

| 3,746,554 A | 7/1973 | Endicott et al. |
| 2016/0242432 A1 | 8/2016 | Windhab et al. |

FOREIGN PATENT DOCUMENTS

| WO | WO-2006005525 A1 * | 1/2006 | ............... A23C 9/16 |
| WO | 2006130698 | 12/2006 | |
| WO | WO-2017093302 A1 * | 6/2017 | ............... A23G 1/36 |
| WO | 2018100059 | 6/2018 | |

\* cited by examiner

Primary Examiner — Jenna A Watts
(74) Attorney, Agent, or Firm — K&L Gates LLP

(57) ABSTRACT

The present invention relates to amorphous particles comprising sugar and a bulking agent, having a closed porosity of lower than 20%. Further aspects of the invention relate to a food product comprising the amorphous particles; a process of making the amorphous particles and a fat based confectionery product containing them; and the use of the amorphous particles as bulk sugar replacers in food products such as fat based confectionery products for example, chocolate.

14 Claims, No Drawings

AMORPHOUS PARTICLES FOR REDUCING SUGAR IN FOOD

CROSS REFERENCE TO RELATED APPLICATIONS

The present application is a National Stage of International Application No. PCT/EP2019/084037, filed on Dec. 6, 2019, which claims priority to European Patent Application No. 18210742.5, filed on Dec. 6, 2018, the entire contents of which are being incorporated herein by reference.

FIELD OF THE INVENTION

The present invention relates to amorphous particles comprising sugar, a bulking agent and optionally a surfactant, having a closed porosity of less than 20%. Further aspects of the invention relate to a food product comprising the amorphous particles; a process of making the amorphous particles and a fat based confectionery product containing them; and the use of the amorphous particles as bulk sugar replacers in food products such as fat based confectionery products for example, chocolate.

BACKGROUND OF THE INVENTION

Any discussion of the prior art throughout the specification should in no way be considered as an admission that such prior art is widely known or forms part of common general knowledge in the field.

The increasing interest in reduced sugar intake in the diet by health conscious consumers has led to a strong demand for food products with lower sugars. Sugar, however, is a key food ingredient that in addition to imparting natural sweetness to food products also functions to provide bulk and therefore plays a significant role in the structure, volume and mouthfeel of the finished food product.

Sugar is a naturally occurring sweetener that as aforementioned provides the sweetness in food products that consumers crave but is also highly calorific and so there is an important need for healthier, non-caloric or low-caloric sweetener alternatives. There have been many approaches that are well known in the art, involving the replacement or reduction of sugars in food products such as for instance using artificial sweeteners to replace natural sugar. More particularly, for example, for fat based confectionery products such as chocolate, many attempts have been made to provide a substitute for sugar using reduced sugar alcohols or polyols. Other approaches have included using bulking agents such as, non or low-caloric fibres to replace sugar in chocolate compositions. These approaches however, have associated disadvantages, for instance polyols are well known to have undesirable laxative effects and furthermore such artificial sweeteners are not well perceived by consumers who have a preference for clean label products. There are also certain disadvantages linked to the use of bulking agents to replace sugars in food products this is mainly the associated undesirable impact on sweetness usually a reduction in sweetness.

Thus, it is generally well known to those skilled in the art of food manufacturing that replacing or reducing sugar in a food composition usually negatively impacts the flavour, and other taste components. For instance, sugar replacers may be slower in onset of the sweetness perception and longer in duration compared to natural sugar and so therefore change the taste balance of a food composition.

In addition sugar replacers may not deliver as sweet a taste as natural sugar and may also exhibit, metallic, cooling, astringent, liquorice-like, and bitter after tastes.

In a further example, applying the prior art solutions as aforementioned for fat based confectionery products may also result in similar disadvantages. For instance, using bulking agents such as fibres in chocolate compositions leads to bitter aftertastes and adds undesirable bulk to the mixture, resulting in an increase in the viscosity of the mixture. This in turn makes it difficult to carry out the standard post-processing of the mixture such as enrobing and moulding which are essential steps towards furnishing a finished chocolate product.

Additionally, sugar provides certain sensory and perception properties to products that are very hard to replicate with the above-mentioned sugar replacers. Hence, whilst the calorie content is reduced, the eating experience is often worsened. Proposed routes to overcome these issues often involve an increase in fat content, which offsets the potential health benefits.

There thus remains the problem of providing low calorie or reduced sugar alternatives to natural sugar which may be used in food products or confectionery products without having a detrimental impact on the sweetness perception and/or any of the above associated problems of the prior art solutions.

Accordingly, there remains a need to find low calorie sugar replacers that can be used in a food product or confectionery compositions such as chocolate for example, which avoids the problems of loss or reduction in sweetness, bitter aftertastes and off-flavours and maintain organoleptic properties.

Accordingly, there remains a need to provide low calorie sugar replacers that are "clean label" and more desirable to the consumer.

It is thus desirable to provide a healthier, reduced calorie or reduced sugar alternative to natural sugar that may be used in food products or confectionery products wherein there is little or no negative impact on sweetness perception.

There thus exists a need to solve one or more of the above-mentioned problems.

It is an object of the present invention to ameliorate at least one disadvantage of the prior art as aforementioned of previous reduced or low calorie sugar alternatives such as artificial sweeteners and/or bulk sugar replacers such as fibres.

SUMMARY OF THE INVENTION

Accordingly, this need is solved by the features of the independent claims. The dependent claims further develop the central idea of the invention.

Thus, in a first aspect, the present invention relates to amorphous particles comprising sugar and a bulking agent wherein said amorphous particles have a closed porosity of less than 20%. Said amorphous particles may be spherical, for example may have a sphericity of between 0.8 and 1, preferably is between 0.85 and 1.0, and preferably between 0.85 and 0.975.

It has been surprisingly found by the inventors that the amorphous particles of the present invention can be used to replace sugar (such as sucrose) in a food product for example without having a detrimental effect on the sweetness of the food product and also the organoleptic properties of the product. This is a key advantage of the present invention, the reduction in sugar content without any loss in organoleptic properties, for example, no associated significant clagginess (i.e. stickiness or tackiness).

Also surprisingly, it was found that the amorphous particles of the present invention overcome the problems normally associated with handling amorphous sugar based powder materials and can, contrary to known amorphous sugar based materials, be used in chocolate compositions, for example. So for example, because of the hygroscopic nature and so its water content amorphous sugar is not typically used in chocolate compositions. It undesirably absorbs water from the environment and other chocolate ingredients generating potential difficulties during processing and storage. Furthermore, the amorphous state can be unstable, and amorphous sugars, such as sucrose or dextrose, tend to rapidly crystallise in the presence of moisture and/or release moisture from crystallisation.

In another aspect, there is provided a food product comprising the amorphous particles of the present invention. The food product may for example contain 5 to 60% of the amorphous particles.

In a further aspect a food product according to the present invention is a confectionery product, a culinary product, a dairy product, a nutritional formula, a breakfast cereal or an ice cream.

In a still further aspect of the present invention, the food product is a fat based confectionery product, for example chocolate.

Advantageously, the present invention makes possible the preparation of food products such as fat based confectionery products in which the high calorific natural sugar can be wholly and/or partially replaced by the low calorific amorphous particles of the present invention.

Advantageously, the amorphous particles of the present invention are more easily dispersed within a fat based continuous phase and require a minimal amount of carrier fluid, for example in the preparation of fat based confectionery products, for example chocolate.

In another aspect of the present invention there is provided a process of making the amorphous particles comprising the steps of a) subjecting a mixture comprising sugar and bulking agent to high pressure, preferably 200 to 300 bar, more preferably 215 to 275 bar, and b) spraying and drying the mixture to form amorphous particles.

In another aspect there is provided a use of the amorphous porous sucrose particles of the present invention as a sugar replacer in a food product.

In another aspect of the present invention there is provided a fat based confectionery composition comprising a) cocoa powder or cocoa liquor or cocoa butter or cocoa butter equivalents or any combinations thereof and b) 5 to 60 wt % of amorphous particles according to the present invention wherein said amorphous particles comprise sugar and a bulking agent, and wherein said amorphous particles have a closed porosity of less than 20%.

In another aspect there is provided a use of the amorphous particles of the present invention as a bulk sugar replacer in a food product.

In a further aspect of the present invention, the food product is a confectionery product, a culinary product, a dairy product, a nutritional formula, a breakfast cereal or an ice cream.

In another aspect of the present invention there is provided a sugar replacement or sweetener composition comprising amorphous particles comprising sugar and a bulking agent, wherein said amorphous particles have a closed porosity of less than 20%.

Surprisingly, the amorphous particles of the present invention overcome the usual problems associated with handling amorphous powders such as hygroscopicity.

Advantageously, the amorphous particles of the present invention are more stable and less likely to recrystallize.

Furthermore, advantageously, the present invention makes possible the preparation of food products, in particular fat based confectionery food products incorporating the amorphous particles of the present invention, having better stability and so resulting in a longer shelf life of such products.

Advantageously the amorphous particles of the present invention are much easier to process in food recipes, for example chocolate recipes, compared to conventional sugar.

Additionally, preferably the control of the porosity and preferably control of the particle size distribution contributes to matching the organoleptic properties of sugar, preferably by providing a sugar replacer with a smooth mouthfeel, i.e. no associated clagginess (i.e. stickiness or tackiness).

In a further aspect of the present invention there is provided a sugar replacement composition suitable for partial or whole replacement of sugar in foodstuffs.

Advantageously, the present invention provides replacement of sugar in foodstuffs but still achieving the same or similar level of sweetness. The present invention makes it possible to completely replace sugar in a foodstuff, for example a chocolate product, with the amorphous particles of the present invention.

Advantageously the amorphous particles of the present invention can be used as a natural low calorie sugar alternative. Thus, the amorphous particles of the present invention provide the reduction of sugar in food products without the need to use artificial sweeteners and/or conventionally known bulking agents.

DETAILED DESCRIPTION OF THE INVENTION AND THE PREFERRED EMBODIMENTS

According to the present invention the term 'amorphous' as used herein is defined as being essentially free of crystalline material and should be interpreted in line with conventional understanding of the term.

According to the present invention, the term glass transition temperature (Tg) as used herein is to be interpreted as is commonly understood, as the temperature at which an amorphous solid becomes soft upon heating or brittle upon cooling. The glass transition temperature is always lower than the melting temperature (Tm) of the crystalline state of the material. An amorphous material can therefore be conventionally characterised by a glass transition temperature, denoted Tg.

Several techniques can be used to measure the glass transition temperature and any available or appropriate technique can be used, including differential scanning calorimetry (DSC) and dynamic mechanical thermal analysis (DMTA). A specific example of an applicable DSC is given in the examples section.

In a preferred embodiment of the present invention the amorphous particles are characterised as having a glass transition temperature of at least 35° C. or higher, preferably at least 40° C. or higher and more preferably at least 45° C. or higher. In an embodiment of the present invention, the glass transition temperature is lower than 65° C., preferably lower than 60° C., optionally lower than 55° C. or lower than 50° C. A preferred example is a glass transition temperature between 35° C. and 65° C.

Advantageously in contrast to prior art solutions, the amorphous particles of the present invention are less hygroscopic making such material easier to handle and incorporate into conventional preparations of foodstuffs such as for example chocolate manufacture.

According to the present invention, the term porous as used herein is defined as multiple non-interconnected small pores, voids or interstices that allow air or liquid to pass through. In the context of the present invention porous is also used to describe the porosity of the amorphous particles of the present invention.

In the present invention the term porosity as used herein is defined as a measure of the empty spaces (or voids or pores) in a material and is a ratio of the volume of voids to total volume of the mass of the material as a percentage between 0 and 100%.

Porosity can be measured by means known in the art. For instance, the particle porosity can be measured by the following equation:

Porosity=$Vp$-$Vcm$/$Vp$×100 wherein $Vp$ is the Volume of the particle and $Vcm$ is the volume of the matrix or bulk material.

According to the present invention the term closed or internal porosity as used herein refers in general terms to the total amount of void or space that is trapped within the solid. As can be seen in the figures, fragmented amorphous particles of the present invention show the internal microstructure wherein the voids or pores are not connected to the outside surface of the said particles. In the present invention, the term closed porosity is further defined as the ratio of the volume of closed voids or pores to the particle volume.

In a preferred embodiment of the present invention, the amorphous particles have a closed porosity of less than 20%, preferably less than 18.0%, preferably less than 17.5%, or less than 15%, less than and not including 15% or less than 10%.

In a preferred embodiment of the present invention, the amorphous particles have a closed porosity of greater than 2.5%, preferably greater than 5.0%, greater than 7.5%, or greater than 10.0%.

In a further preferred embodiment, the amorphous particles of the present invention have a closed porosity of between 2.5 and less than 20%, more preferably 5.0 to 18.0%.

According to the present invention, the term density as used herein is defined in conventional terms as the volumetric mass density of a substance and this is the mass per unit volume of a material. Density should be interpreted in line with conventional understanding of the term.

In a preferred embodiment of the present invention, the amorphous particles of the present invention have a density of between 1 to 2 g/cm$^3$, preferably 1.3 to 1.7 g/cm$^3$, more preferably 1.5 to 1.65 g/cm$^3$.

In the context of the present invention, the term bulk density as used herein refers to in conventional terms the weight of a unit volume of a loose material such as powder, to the same volume of water, and is typically expressed as kilograms per cubic metre (kg/cm$^3$) or g/cm$^3$ As previously described, the amorphous nature of the particles leads to faster dissolution in the mouth. Advantageously, the nature of the particles of the present invention provides an enhanced sweetness and attractive mouthfeel, particularly in fat based confectionery products where the prior art disadvantages associated with replacing sugar with conventional bulking agents usually leads to poor organoleptic qualities, such as grittiness and lack of sweetness.

As mentioned above, specifically, the particle size distribution of the present invention also provides an improvement in the organoleptic property of mouthfeel, in particular a lack of clagginess, without a loss in sweetness nor a gritty mouthfeel.

The D90 value is a common method of describing a particle size distribution. The D90 is the diameter where 90% of the mass of the particles in the sample have a diameter below that value. In the context of the present invention, the D90 by mass is equivalent to the D90 by volume. The D90 value may be measured for example by a laser light scattering particle size analyser. Other measurement techniques for particle size distribution may be used depending on the nature of the sample. For example, the D90 value of powders may conveniently be measured by digital image analysis (such as using a Camsizer XT) while the D90 value of particles comprised within a fat continuous material such as chocolate may be measured by laser light scattering. The above definitions and measurement methods apply generally to D10 (diameter where 10% of the mass of the particles in the sample have a diameter below that value) and D50 (diameter where 50% of the mass of the particles in the sample have a diameter below that value).

In a further aspect, the amorphous particles of the present invention have a D90 particle size greater than 50 microns, for example preferably greater than 55 microns, greater than 60 microns, for example greater than 65 microns or greater than 70 microns.

In a further aspect, the amorphous particles of the present invention have a D90 particle size less than 150 microns, for example preferably less than 120, preferably less than 115 microns, more preferably less than 105 microns, more preferably less than 95 microns, less than 90 microns, or less than 80 microns.

In a preferred embodiment, the amorphous particles of the present invention have a D90 particle size from 50 to 150 microns, preferably from 60 to 120 microns or preferably from 70 to 90 microns. In a most preferred embodiment, the particles may have a D90 of from 60 to 80 microns.

The amorphous particles of the present invention may have a diameter D50 of less than 120 microns, preferably less than 100 microns, more preferably less than 80, or even more preferentially less than 50 microns.

In a further aspect, the amorphous particles of the present invention have a D50 particle size greater than 20 microns, for example preferably greater than 25 microns, greater than 30 microns, for example greater than 35 microns or greater than 40 microns.

In a most preferred embodiment, the D50 particle size is between 20 and 120 microns, preferably between 30 and 50 microns.

The amorphous particles of the present invention may have a diameter D10 of less than 50 microns, preferably less than 40 microns, more preferably less than 35 microns, or even more preferentially less than 30 microns.

In a further aspect, the amorphous particles of the present invention have a D10 particle size greater than 5 microns, for example preferably greater than 10 microns, greater than 15 microns, for example greater than 20 microns.

In a most preferred embodiment, the D10 particle size is between 5 and 50 microns, preferably between 15 and 30 microns.

In an embodiment of the present invention, the breadth of the particle size distribution is optionally defined by the parameter (D90-D10), i.e. the difference between the D90 value and the D10 value in microns. This value is only positive. In an embodiment, the difference between D90 and D10 is between 10 and 145 microns, preferably between 30 and 110 microns, preferably between 35 and 70 microns, preferably between 35 and 50 microns.

In an embodiment of the present invention, the particle size distribution is optionally defined by the parameter (D90-D10)/D50, i.e. the difference between the D90 value and the D10 value in microns divided by the D50 value. In an embodiment, this value is between 0.2 and 3.25, preferably between 0.4 and 2.5, more preferably between 0.7 and 1.5 and more preferably between 0.95 and 1.20.

In an embodiment of the present invention, the content of particles having a particle size below 10 microns is less than 20% of the total number of particles, preferably less than 15%, more preferably less than 10% and most preferably less than 5%. In an embodiment, the content of particles having a particle size below 10 microns is between 0.25% and 20% or between 0.5% and 10%, preferably between 0.5% and 5%. In a most preferred embodiment, it is this particle size distribution that contributes to the control in the reduction of clagginess.

Hence, a preferred embodiment of the present invention provides amorphous particles comprising sugar and a bulking agent, wherein said amorphous particles have a closed porosity of less than 20% and a D90 particle size of greater than 45 microns and a content of particles having a particle size below 10 microns is less than 20% of the total number of particles, preferably a porosity of less than 15%, a D90 particle size of between 60 microns and 80 microns and a content of particles having a particle size below 10 microns is less than 10%.

In an embodiment of the present invention, the specific surface area of the particle is between 0.040 m$^2$/g and 0.120 m$^2$/g, preferably between 0.042 m$^2$/g and 0.110 m$^2$/g.

The amorphous particles of the invention may have a moisture content between 0.5 and 6%, for example between 1 and 5%, for further example between 1.5 and 3%.

In a preferred embodiment of the present invention provided are amorphous particles comprising sugar, and a bulking agent, wherein said amorphous particles have a closed porosity of less than 20% and a D90 particle size from 50 to 150 microns.

In a preferred embodiment of the present invention provided are amorphous particles comprising sugar and a bulking agent, wherein said amorphous particles have a closed porosity of less than 18% and greater than 2.5% and a D90 particle size from 60 to 95 microns.

According to the present invention the term sugar as used herein refers to as is conventionally understood a sweet crystalline substance obtained from various plants, especially sugar cane and sugar beet, and used as a sweetener in food and drink. In the context of the present invention sugar is defined as and includes all mono, di and oligo-saccharides for example sucrose, fructose, glucose, dextrose, galactose, allulose, maltose, high dextrose equivalent hydrolysed starch syrup, xylose, and combinations thereof. Accordingly, the sugar comprised within the amorphous particles according to the invention may be selected from the group consisting of sucrose, fructose, glucose, dextrose, galactose, allulose, maltose, high dextrose equivalent hydrolysed starch syrup xylose, and any combinations thereof.

In a preferred embodiment, the amorphous particles of the present invention comprise sugar in the amount of 10 to 90%, preferably 15 to 90%, more preferably 20 to 85%, 25 to 75% or 20 to 45%. For example, between 20 and 40% or between 25 and 45%.

According to the present invention the term bulking agent as used herein refers to as is conventionally understood a food additive that increases food volume or weight without impacting the utility or functionality of a food. In a particularly preferred embodiment of the present invention, the bulking agents of the present invention are low or non-calorific additives, which impart bulk and provide advantageously healthier alternatives to for example sugar.

According to conventional understanding bulking agents may be used to partially or completely replace high-caloric ingredients, such as sugar to prepare an edible formulation with a reduction in calories. Additionally, the bulking agents are useful as a source of soluble fibre to be incorporated into foods and, unlike sugar, are non-cariogenic.

In an embodiment, the amorphous particles of the present invention comprise a bulking agent or the bulking agent and surfactant in combination in the amount of 5 to 90%, preferably 10 to 85%, 15 to 80%, preferably 25 to 75% or 40 to 75%.

The amorphous particles may comprise (for example consist on a dry basis of) sucrose and skimmed milk, the sucrose being present at a level of at least 30% in the particles, the ratio of sucrose to skimmed milk being between 0.5 to 1 and 2.5 to 1 on a dry weight basis, for example between 0.6 to 1 and 1.5 to 1 on a dry weight basis.

In a preferred embodiment of the present invention provided are amorphous particles comprising sugar and a bulking agent, wherein said amorphous particles have a closed porosity of less than 20% and a D90 particle size from 50 to 150 microns, wherein the sugar is present in an amount of 20 to 85% and the bulking agent or the bulking agent and a surfactant in combination are present in an amount of 15 to 80%.

In a preferred embodiment of the present invention provided are amorphous particles comprising sugar, and a bulking agent, wherein said amorphous particles have a closed porosity of less than 18% and greater than 2.5% and a D90 particle size from 60 or 65 to 95 microns, wherein the sugar is present in an amount of 20 to 45% and the bulking agent or the bulking agent and a surfactant in combination are present in an amount of 55 to 80%.

According to the present invention the bulking agent may be selected from the group consisting of polyols (sugar alcohols for example isomalt, sorbitol maltitol, mannitol, xylitol, erythritol and hydrogenated starch hydrolysates) guar gum, psyllium husk, carnuba wax, glycerin, beta glucan, polysaccharides (such as starch or pectin for example), dietary fibres (including both insoluble and soluble fibres), polydextrose, methylcellulose, maltodextrins, inulin, milk powder (for example skimmed milk powder), whey, demineralised whey powder, dextrins such as soluble wheat or corn dextrin (for example Nutriose®), soluble fibre such as Promitor® and any combination thereof.

In a preferred embodiment of the present invention the bulking agent may be selected from the group consisting of maltodextrins, milk powder (for example skimmed milk powder (SMP)), demineralised whey powder (DWP), soluble wheat or corn dextrin (for example Nutriose®), polydextrose, soluble fibre such as Promitor® and any combinations thereof.

The amorphous particles of the invention may comprise (for example consist on a dry basis of) sucrose and skimmed milk, the sucrose being present at a level of at least 30% in the particles. The ratio of sucrose to skimmed milk may be between 0.5 to 1 and 2.5 to 1 on a dry weight basis, for example between 0.6 to 1 and 1.5 to 1 on a dry weight basis.

The skimmed milk may have a fat content below 1.5% on a dry weight basis, for example below 1.2%.

The components of skimmed milk may be provided individually and combined with sucrose, for example, the amorphous particles of the invention may comprise sucrose, lactose, casein and whey protein.

Sucrose and skimmed milk provide an amorphous particle, which has good stability against recrystallization without necessarily requiring the addition of reducing sugars or polymers. For example, the amorphous particles of the invention may be free from reducing sugars (for example fructose, glucose or other saccharides with a dextrose equivalent value. The dextrose equivalent value may for example be measured by the Lane-Eynon method). For further example, the amorphous particles of the invention may be free from oligo- or polysaccharides having a three or more saccharide units, for example maltodextrin or starch.

The amorphous particles of the invention may comprise sugar, bulking agent and optionally a surfactant, all distributed throughout the continuous phase of the particles. Higher concentrations of the surfactant may be present at the gas interfaces than in the rest of the continuous phase, but the surfactant may be present in the continuous phase inside the particles, not just coated onto the exterior.

In a preferred embodiment of the present invention the particles have one continuous phase (i.e. preferably no matrix or discontinuous phases) and are substantially free of crystalline content (i.e. preferably the particles comprise no more than 20%, preferably no more than 15%, more preferably no more than 10%, most preferably no more than 5%, especially no more than 2%, for example about 0% of crystalline content).

In a preferred embodiment, the particles are a continuous amorphous phase with no crystalline content.

In an embodiment, the amorphous particles of the present invention comprise a surfactant in the amount of 0.5 to 15%, preferably 1 to 10%, more preferably 1 to 5%, even more preferentially 1 to 3%.

According to the present invention the surfactant may be selected from the group consisting of lecithin, whey proteins, milk proteins, sodium caseinate, lysolecithin, fatty acid salts, lysozyme, sodium stearoyl lactylate, calcium stearoyl lactylate, lauroyl arginate, sucrose monooleate, sucrose monostearate, sucrose monopalmitate, sucrose monolaurate, sucrose distearate, sorbitan monooleate, sorbitan monostearate, sorbitan monopalmitate, sorbitan monolaurate, sorbitan tristearate, PGPR, PGE and any combinations thereof.

In a preferred embodiment of the present invention, the surfactant may be sodium caseinate or lecithin.

It will be well understood in the art that in embodiments according to the present invention wherein the bulking agent is derived from milk powder such as skimmed milk powder or demineralised whey powder certain surfactants are inherently present.

The porous nature of the amorphous particles of the invention may lead to them being lighter in colour than solid crystalline materials such as sucrose crystals. This can be counteracted by the addition of opaque or coloured materials. The amorphous particles of the invention may comprise coloured ingredients, for example caramelized sugars or permitted food colours, for example natural food colours.

According to the present invention there is provided a process for preparing the amorphous particles of the present invention.

In a preferred embodiment, the amorphous particles of the present invention are prepared according to spray-drying methods as here below described.

In a preferred aspect of the present invention there is provided a process to prepare the amorphous particle of the present invention comprising in its broad aspects the steps of:
  subjecting a mixture comprising sugar, and bulking agent to high pressure, preferably 200 to 300 bar, more preferably 215 to 275 bar; and
  spraying and drying the mixture to form amorphous porous particles.

In a preferred embodiment, no gas is added during the production process. Specifically, no gas is added before the mixture has been pressurised and no gas is added after the mixture is pressurised. The gas maybe selected from the group consisting of nitrogen, air or carbon dioxide or any combination thereof.

In a preferred embodiment of the present invention, the mixture comprising sugar, bulking agent and optionally surfactant may be mixed with more than 30% water (based on a total content by weight of the sugar, bulking agent, optionally surfactant and water), preferably more than 40% water and preferably less than 60% water until full dissolution is achieved.

In a preferred embodiment of the present invention the mixture comprising sugar and bulking agent, and optionally surfactant, is subjected to high-pressure, for example a pressure greater than 200 bar, typically 200 to 300 bar, preferably 215 to 300 bar, and more preferably 215 to 275 bar.

The drying may be spray-drying, for example, the spraying and drying may be spray-drying.

In an embodiment, the drying is such that the amorphous particles have a moisture content of less than 5%, preferably between 1% and 5% (for example between 2% and 3%).

In an embodiment of the present invention, a nozzle with a bore diameter of greater than 0.40 mm, preferably greater than 0.45 mm, preferably greater than 0.55 mm, preferably greater than 0.6 mm, preferably greater than 0.60 mm and preferably greater than 0.65 mm is used. In an embodiment of the present invention a nozzle with a bore diameter of less than 1.20 mm, preferably less than 1.00 mm, preferably less than 0.95 mm, preferably less than 0.85 mm and preferably greater than 080 mm is used. In a preferred embodiment, the nozzle has a bore diameter of between 0.40 mm and 1.20 mm, preferably between 0.55 m and 0.95 mm and most preferably greater than 0.65 mm. The above nozzle dimensions aid the provision of the desired particle size distributions, preferably the nozzle size of greater than 0.60 mm or greater than 0.65 mm provides the desired reduction in fines content (i.e. reduction of particles of less than 10 microns in size).

In an embodiment of the present invention, a nozzle is used at an angle of between 45 and 85°, optionally between 55 and 80°.

In a preferred embodiment of the present invention in order to aid the provision of the desired particle size distributions there is no recirculation of particles back into the drying chamber.

In an alternative embodiment it is plausible that other known procedures may be used to carry out the process of the present invention for example, foam drying, freeze drying, tray drying, fluid bed drying and the like.

It is advantageous that the amorphous particles of the invention are able to survive size reduction processes used in chocolate manufacture such as roll refining. Pores of approximately spherical shape provide a strong structure to the particles.

In a further aspect, the present invention also provides for amorphous particles obtained by the said method as described herein.

According to a general aspect of the present invention, the amorphous particles of the present invention have a wide range of utilities, including all of the applications in dry food mixes for which sugar is normally employed. For instance, said particles of the present invention may be used in a variety of food products for example, a confectionery product, a culinary product, a dairy product, a nutritional formula, a breakfast cereal or an ice cream. In one preferred aspect of the present invention, the focus is on the use of the amorphous particles to replace sugar in confectionery products (including both fat and sugar based confectionery products). In an embodiment, the invention provides a food product wherein amorphous particles have not been refined. In the context of the present invention, the term "refined" refers to material, which has been subjected to a refining process to reduce the particle size of the material's solids. In the manufacture of fat-based confectionery products, processes such as roll refining and air classifier milling are used to refine the confectionery mass.

In the present invention the term 'confectionery product' or 'fat-based confectionery product' is to be understood as meaning chocolate product, chocolate-like product (e.g., comprising cocoa butter replacers, cocoa butter equivalents or substitutes), a coating chocolate, a chocolate-like coating product, a coating chocolate for ice-creams, a chocolate-like coating for ice-cream, a praline, a chocolate filling, a fudge, a chocolate cream, an extruded chocolate product or the like. The fat-based confectionery product may be a white chocolate; comprising sugar, milk powder and cocoa butter but not dark cocoa material. The product may be in the form of an aerated product, a bar, or a filling, among others. The chocolate products or compositions can be used as coatings, fillers, enrobing compositions or other ingredients in a finished or final food or confectionery product. The confectionery product of the invention may further contain inclusions such as nuts, cereals, and the like.

In an alternative embodiment, confectionery product also includes non-fat based confectionery products such as conventional sugar confectionery.

According to the knowledge of the skilled person the confectionery products comprising the amorphous particles of the present invention may also be used as a filling between biscuits (for example wafers), as part of a coating or as a coating. It can also comprise inclusions such as nuts, puffed cereal, chocolate chips, sugar chips, fruit pieces, caramel pieces, biscuits, wafers, creams or the like.

In another embodiment of the present invention there is provided a fat based confectionery composition comprising
a) Cocoa powder or cocoa liquor or cocoa butter or cocoa butter equivalents or any combinations thereof and
b) 5 to 60 wt % of amorphous particles according to the present invention.

The invention may provide a fat based confectionery composition comprising
a) cocoa powder or cocoa liquor or cocoa butter or cocoa butter equivalents or any combinations thereof and
b) 5 to 60% of amorphous particles according to the present invention.
wherein said amorphous particles comprise (for example consist on a dry basis of) sucrose and skimmed milk, the sucrose being present at a level of at least 30% in the particles, the ratio of sucrose to skimmed milk being between 0.5 to 1 and 2.5 to 1 on a dry weight basis, for example between 0.6 to 1 and 1.5 to 1 on a dry weight basis. It is advantageous that the fat based confectionery composition may comprise only ingredients commonly found in fat based confectionery products such as chocolate. The amorphous particles comprised within the fat based confectionery may be free from reducing sugars and/or free from oligo- or polysaccharides having a three or more saccharide units.

In a preferred embodiment to the present invention, the fat based confectionery product comprises 5 to 60% of the amorphous particles, preferably 10 to 50%, more preferably 20 to 40%.

According to the present invention, the fat based confectionery product comprising the amorphous particles of the present invention is prepared according to conventional chocolate making processes as will be well known and obvious to a person skilled in the art.

In one preferred embodiment of the present invention there is provided a process of making a fat based confectionery product comprising amorphous particles comprising the steps of:
a) subjecting a mixture (for example an aqueous mixture) comprising sugar and bulking agent to high pressure, preferably 200 to 300 bar, more preferably 215 to 275 bar;
b) spraying and drying the mixture to form amorphous particles;
c) mixing the amorphous particles with fat and optionally ingredients selected from the group consisting of milk powder, cocoa liquor, crystalline sugar, lecithin and combinations of these, preferably at a temperature between 35 and 55° C. for 2 to 20 minutes; and
d) mixing the mixture with further fat and optionally lecithin and liquefying.

In an alternative preferred embodiment, the process of making a fat based confectionery product comprising amorphous particles of the present invention may comprise the steps of:
a) subjecting a mixture (for example an aqueous mixture) comprising sugar, bulking agent and optionally surfactant to high pressure, preferably 200 to 300 bar, more preferably 215 to 275 bar
b) spraying and drying the mixture to form amorphous particles
c) mixing fat, and optionally milk powder, cocoa liquor, crystalline sugar and lecithin, preferably at a temperature between 35 and 55° C. for 2 to 20 minutes and
d) mixing the mixture with the amorphous particles of the present invention and further fat and optionally lecithin and liquefying.

The fat may for example be cocoa butter, cocoa butter equivalent or cocoa butter replacer. The fat may be cocoa butter. Some or all of the milk powder, cocoa liquor and crystalline sugar may be replaced by chocolate crumb. In a preferred embodiment, the liquefaction is carried out by conventional means well known to a person skilled in the art and refers to conching, a standard process in chocolate manufacture. In a preferred embodiment, 15 to 30% of the total fat present after liquefying is used in step (d).

Advantageously, the harsh processing conditions of the chocolate making process, such as refining, do not destroy the particles of the present invention, In an embodiment, the outer layer of the confectionery product of the invention comprises (for example consists of) a fat continuous confectionery material such as chocolate or chocolate-like material. The confectionery product may be a shell-moulded product, for example where the outer layer is formed first in a mould and then filled with the filling, or the confectionery product may be an enrobed product, where the filling is formed first and then coated in liquid chocolate. The outer layer may comprise between 10 and 60 wt. % (for example between 30 and 50 wt. %) of the confectionery product and the filling may comprise between 40 and 90 wt. % (for example between 50 and 70 wt. %) of the confectionery product.

Porous particles comprising an amorphous continuous phase may be present in the filling at a level of between 2 and 40 wt. %, for example between 5 and 35 wt. %, for further example between 10 and 30 wt. %.

In an embodiment, the filling according to the invention comprises soluble fibre. The soluble fibre may for example be Promitor® from Tate & Lyle, or Nutriose® from Roquette. When seeking to communicate reduced sugar in confectionery products, many food and labelling jurisdictions require that all sugars are considered. So for example, the lactose in milk ingredients contributes to the total sugar. Porous particles having an amorphous continuous phase comprising sucrose and skimmed milk allow an increases sweetness perception and increased milk content as previously described. However, the lactose content contributes to the overall sugar in the product. The inventors have found that up to 20 wt. soluble fibre may be included in the filling while still retaining an attractive mouthfeel. This reduces the overall sugar content of the product. The soluble fibre may be added to the filling in addition to the porous particles, and/or the porous particles may comprise the soluble fibre. For example the filling of the confectionery product of the invention may comprise porous particles having an amorphous continuous phase comprising a sweetener, soluble fibre and optionally a surfactant. For example the filling of the confectionery product of the invention may comprise porous particles having an amorphous continuous phase comprising sucrose, soluble fibre and a protein. For further example the porous particles may have an amorphous continuous phase comprising sucrose, soluble fibre and a protein selected from the group consisting of casein, whey protein, wheat gluten and almond protein.

In an embodiment, the filling according to the invention comprises inclusions. The inclusions may be selected from the group consisting of crispy inclusions (for example puffed rice puffed wheat, extruded cereal pieces, cereal crispies such as oat or rice crispies); fruits (for example raisins, cranberries, blueberries, blackcurrant, apples, pear, orange, apricot, freeze-dried fruit pieces, candied fruit); nuts (for example hazelnuts, almonds, brazil nuts, cashew nuts, peanuts, pecans); chocolate or chocolate-like material (for example chocolate vermicelli, chocolate shapes); sugar confectionery (for example cinder toffee pieces, marshmallow, sugar-panned centres) and combinations thereof. Fruit and nut inclusions are typically pieces of fruit or nuts. The inclusions may have a particle size between 1 and 8 mm, for example the inclusions may pass through a sieve having 8 mm openings but be retained by a sieve having 1 mm openings.

In an embodiment, the filling according to the invention comprises flavours. In a further embodiment the confectionery product, for example the filling, may comprise sweetness enhancers.

In an embodiment, the filling according to the invention comprises fat. For example the filling may comprise between 5 and 70 wt. % porous particles, between 0 and 20 wt. % soluble fibre, between 0 and 15 wt. % inclusions (for example cereal crispies) and between 20 and 60% wt. % fat.

In the context of the present invention, the term fat refers to triglycerides. Fats are the chief component of animal adipose tissue and many plant seeds. Fats which are generally encountered in their liquid form are commonly referred to as oils. In the present invention the terms oils and fats are interchangeable. The filling according to the invention may have a continuous fat phase. The fat comprised within the confectionery product of the invention may be selected from the group consisting of shea butter, kokum butter, salt butter, cocoa butter, palm oil, algal oil, safflower oil, soybean oil, rapeseed oil such as canola oil, olive oil, macademia nut oil, hazelnut oil, avocado oil, sunflower oil, grape-seed oil, cotton-seed oil, corn oil and combinations of these.

In an embodiment, the confectionery product of the invention may comprise more than 30 wt. % milk solids, for example more than 35 wt. % milk solids, for further example more than 40 wt. % milk solids. Several nutritional benefits are desired by a consumer because of the content of milk. Milk is a complex biological fluid containing proteins, minerals, vitamins, enzymes, fats and sugar. Milk contains a high amount of fat which typically contributes to the quality of chocolate products, but which can detract from milk's nutritional value if excessively increased. However, it would be beneficial to increase the content of the nonfat nutritional value of milk in milk chocolate.

In an embodiment the confectionery product may be a chocolate (or chocolate-like) product, for example it may comprise at least 20 wt. % chocolate (or chocolate-like) material. In an embodiment, the confectionery product of the invention may comprise milk chocolate. In a further embodiment the confectionery product of the invention may comprise white chocolate, white chocolate comprising sugar, milk powder and cocoa butter but not dark cocoa material.

The filling according to confectionery product of the invention may comprise biscuit.

The biscuit may be a wafer. Wafers are baked products which are made from wafer batter and have crisp, brittle and fragile consistency. They are thin, with an overall thickness usually between <1 and 4 mm and typical product densities range from 0.1 to 0.3 g/cm3. The surfaces are precisely formed, following the surface shape of the plates between which they were baked. They often carry a pattern on one surface or on both. Wafers may also be produced by extrusion. Two basic types of wafer are described by K. F. Tiefenbacher in "Encyclopaedia of Food Science, Food Technology and Nutrition p 417-420—Academic Press Ltd London—1993":

1) No- or low-sugar wafers. The finished biscuits contain from zero to a low percentage of sucrose or other sugars. Typical products are flat and hollow wafer sheets, moulded cones or fancy shapes.

2) High-sugar wafers. More than 10% of sucrose or other sugars are responsible for the plasticity of the freshly baked sheets. They can be formed into different shapes before sugar recrystallization occurs. Typical products are moulded and rolled sugar cones, rolled wafer sticks and deep-formed fancy shapes.

In an embodiment, the confectionery product of the invention may be a shell-moulded chocolate product comprising biscuit. In an embodiment, the confectionery product of the invention may be a shell-moulded chocolate product comprising wafer layers with a fat-continuous material between the wafer layers, the fat-continuous material comprising dispersed particles having an amorphous continuous phase. In one embodiment of the present invention there is provided a multi-layer laminated product such as confectionery product comprising a plurality of layers of wafer (a sandwich wafer) or a product comprising a plurality of layers of baked foodstuff or biscuit layers, such as a fat-continuous cream layer in a sandwich biscuit. The outer layer of the shell-moulded chocolate product may also comprise porous particles having an amorphous continuous phase. The amorphous continuous phase of the particles may for example comprise sucrose, a bulking agent such as maltodextrin or soluble fibre and wheat gluten.

An aspect of the invention provides a process of making a confectionery product comprising the steps of forming the amorphous particles of the invention as defined herein; mixing the porous particles with fat and optionally ingredients selected from the group consisting of milk powder, cocoa powder, crystalline sugar, soluble fibre, lecithin and combinations of these to form a filling composition; refining at least part of the filling composition to reduce the particle size of at least one of its components; providing a mould, the interior surface of the mould coated with a fat based confectionery material (for example chocolate such as milk chocolate or white chocolate); depositing the filling composition in the mould; applying further fat-based confectionery material to cover the filling composition; cooling the filled mould to solidify the fat-based confectionery material and form a shell-moulded confectionery product; and removing the shell-moulded confectionery product from the mould. The filling composition may be layered between biscuits (such as wafers) before being deposited in the mould. The recipe of the further fat-based confectionery material applied to cover the filling composition may be the same or different from the recipe of the fat-based confectionery material coated on the interior surface of the mould. In the process of the invention, the quantity of fat based confectionery material coated on the interior surface of the mould may be between 2 and 4 times the quantity of fat-based confectionery material applied (for example after excess is scraped off level with the mould) to cover the filling composition, for example it may be between 2.5 and 3.5 times the quantity of fat-based confectionery material applied to cover the filling composition.

Providing a mould, the interior surface of the mould coated with a fat based confectionery material, may be performed by the various shell-moulding techniques known in the art. For example, fat based confectionery material may be deposited into the mould and the mould inverted to leave the interior surface coated with fat-based confectionery material. For further example, fat based confectionery material may be deposited into the mould and a biscuit (for example a layered wafer) may be pushed into the mould to spread the fat-based confectionery material onto the interior surface. For still further example, a cooled plunger may be pushed into a mould which is partly filled with fat-based confectionery material such as chocolate. The fat-based confectionery material forms a partly set shell in the mould, the shape being retained when the plunger is withdrawn.

In a further embodiment, the invention provides a process of making a confectionery product comprising the steps of subjecting a mixture comprising sweetener, bulking agent and surfactant to high pressure, for example a pressure greater than 2 bar, for further example 50 to 300 bar, for still further example 100 to 200 bar; adding gas to the mixture; drying the mixture (for example spraying and drying the mixture) to form porous particles having an amorphous continuous phase; mixing the porous particles with fat and optionally ingredients selected from the group consisting of milk powder, cocoa powder, crystalline sugar, soluble fibre, lecithin and combinations of these to form a filling composition; refining the filling composition to reduce the particle size of at least one of its components; forming the filling into individual units; and enrobing the filling units with a fat based confectionery material (for example chocolate such as milk chocolate or white chocolate).

In an embodiment, the filling comprises between 5 and 70 wt. % porous particles, between 0 and 20 wt. % soluble fibre, between 0 and 15 wt. % inclusions (for example cereal crispies) and between 20 and 60% wt. % fat.

After incorporation into the food products of the present invention, greater than 60% of the particles may be substantially spherical, for example, more than 75% may be substantially spherical, for example, more than 80% may be substantially spherical, for example, more than 85% may be substantially spherical, for example, essentially all of the particles may be substantially spherical. According to the present invention, the term sphericity as used herein refers to in conventional terms a measure of how spherical (round) an object is. In the context of the present invention sphericity refer to the sphericity of the particles and is defined as Sphericity=$4\pi A/P^2$ wherein A is defined as the measured area covered by a particle projection and P is the measured perimeter of a particle projection.

For instance, an ideal sphere would have an expected the sphericity of 1. It is to be commonly understood however that a high degree of sphericity can still be achieved with values less than 1. For example a value between 0.8 and 1 for an object or particle would be considered substantially spherical, preferably between 0.85 and 0.95.

Imaging experiments show clearly that the particles of the present invention retain significant sphericity after the chocolate preparation steps. Sensory evaluations performed showed good tasting qualities and a mouthfeel not displaying any clagginess.

According to the present invention, the amorphous particles in one embodiment are in the form of a powder. In an embodiment, the said amorphous particles of the present invention are not agglomerated by methods known in the art.

In the following description, reference is made to the use of the amorphous particles of the present invention as bulk sugar replacers in fat based confectionery products as a preferred embodiment. The amorphous particles of the present invention may however also be used in a wide range of food products as aforementioned.

In the present invention, the term bulk sugar replacer as used herein refers to a low or no calorie sugar substitute that can be substituted at a weight to weight and/or volume to volume basis for sugar. As aforementioned, the combination of the amorphous porous sugar particles and bulking agent provide a synergistic effect whereby a further bulking effect is achieved through aeration.

Preferably, between 5 to 70% of sugar may be reduced or removed from a food product such as a fat based confectionery product.

In a preferred embodiment, fat content of the fat based confectionery product is greater than 15% of the confectionery product, greater than 20%, or greater than 25%. In a preferred embodiment, fat content of the fat based confectionery product is less than 45% of the confectionery product, less than 40%, less than 35% or less than 30%.

In an embodiment of the invention where the amorphous particles are comprised within a fat based confectionery composition and the particles comprise (for example consist on a dry basis of) sucrose and skimmed milk, increasing the proportion of skimmed milk to sucrose reduces the amount of sucrose in the overall fat based confectionery composition. This can be advantageous, as many consumers would welcome a good tasting fat based confectionery with reduced sugar, and appreciate a high milk content.

Accordingly, the invention may provide a fat based confectionery composition comprising
   a) cocoa powder or cocoa liquor or cocoa butter or cocoa butter equivalents or any combinations thereof and
   b) 5 to 60% (for example 20 to 55%) of amorphous particles according to the present invention.
wherein said amorphous particles have a moisture content of between 1% and 5% (for example between 2% and 3%), comprise sucrose and skimmed milk at a level of at least 95% of the particles on a dry basis (for example at least 98%), have a ratio of sucrose to skimmed milk between 0.5:1 and 0.6:1 and have a closed porosity less than 20% and the amorphous particles may have a D90 particle size distribution of between 50 and 120 microns, for example between 70 and 90 microns.

The inventors have investigated the impact on the stability of the amorphous particles of altering the ratio of sucrose to skimmed milk powder. There is a significant decrease in stability when the ratio of sucrose to skimmed milk powder exceeds 0.6:1. Therefore, when seeking to reduce the sucrose content in a food product by replacing crystalline sucrose with amorphous particles of the invention containing sucrose and skimmed milk an optimum ratio to use is around 0.66:1.

In a preferred embodiment of the present invention, the amorphous sugar particles of the present invention may be used as a bulk sugar replacer in a food product. The amorphous sugar particles of the present invention may be used to reduce the sugar content of a food product. For example, the amorphous sugar particles may be used to reduce the sugar content (for example the sucrose content) of a fat-based confectionery product by between 50 and 70% on a volume basis, or to reduce the sugar content (for example the sucrose content) of a fat-based confectionery product by between 10 and 35% on a mass basis.

In another embodiment of the present invention, the amorphous sugar particles are preferably used in a food product such as a confectionery product, a culinary product, a dairy product, a nutritional formula, a breakfast cereal or an ice cream.

Ranges

In the discussion of the invention herein, unless stated to the contrary, the disclosure of alternative values for the upper and lower limit of the permitted range of a parameter coupled with an indicated that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter unless stated otherwise, i.e. "less than" means "less than and including" and "greater than" means "greater than and including" but "less than and not including" means the boundary value is not included. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

Percentages

Unless otherwise specified % in the present description correspond to wt %

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

Substantially

The term "substantially" (or "essentially") as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" or "free" may similarly denote that quantity or entity to which it refers comprises no more than 20%, preferably no more than 15%, more preferably no more than 10%, most preferably no more than 5%, especially no more than 2%, for example about 0% of the relevant whole.

The term "comprising" as used herein will be understood to mean that the list following is non exhaustive and may or may not include any other additional suitable items, for example one or more further feature(s), component(s), ingredient(s) and/or substituent(s) as appropriate. Thus the words "comprise", "comprising" and the like are to be construed in an inclusive sense as opposed to an exclusive or exhaustive sense; that is to say, in the sense of "including, but not limited to". It should be noted that embodiments and features described in the context of one of the aspects of the present invention also apply to the other aspects of the invention.

The invention will now be described in further details in the following non-limiting examples. The following Examples are provided of illustrative purposes only and they are not to be considered in any way limiting to the scope of the present invention.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

Experimental Section

Determination of Glass Transition Temperature

Glass transition temperatures (Tg) were measured by Differential Scanning calorimetry (TA Instrument Q2000). A double scan procedure was used to erase the enthalpy of relaxation and get a better view on the glass transition. The scanning rate was 5° C./min. The first scan was stopped approximately 30° C. above Tg. The system was then cooled at 20° C./min. The glass transition was detected during the second scan and defined as the onset of the step change of the heat capacity.

Determination of Structures Using Cryo-Scanning Electron Microscopy

Cryo-Scanning Electron Microscopy (Cryo-SEM) and X-ray Tomography (μCT) are used to investigate the microstructure of the amorphous particles of the present invention within a fat based food matrix.

A 1 cm³ piece of sample was glued into a Cryo-SEM sample holder using TissueTek. It was rapidly frozen in slushy nitrogen prior to its transfer into the cryo-preparation unit Gatan Alto 2500 at −170° C. The frozen sample was fractured using a cooled knife, making its internal structure accessible. The fracture was not performed when the external surface of the chocolate was analyzed. A slight etching of superficial water was performed in the preparation unit for 15 min at −95° C., followed by sample stabilization at −120° C. A final coating was done by an application of a 5 nm platinum layer onto the surface. For visualization a FEI Quanta 200 FEG at 8 kV in high vacuum mode was used.

Determination of Sphericity

Sphericity was measured by the Camsizer XT. It is an opto-electronic instrument, allowing the measurement of the size and shape parameters of powders, emulsions and suspensions. The technique of digital image analysis is based on the computer processing of a large number of sample's pictures taken at a frame rate of 277 images/seconds by two different cameras, simultaneously. The sample is lightened by two pulsed LED light sources during the measurement.

Moisture Content

This was determined by TG-DTA (Mettler Toledo Gmbh, Switzerland AG. The thermo-gravimetric analysis enables to record the mass loss of any homogeneous material upon constant heating rate and under controlled dry gas flow conditions. Each sample of 25 mg is submitted to a heating rate of 2° C./min from 25° C. to 180° C. under dry nitrogen flow (100 mL/min). STARe ver. 11 software from Mettler-Toledo or TA Universal is used to analyse the TGA data for moisture content determination.

Particle Size

The particle size values of powders was measured by digital image analysis using a Camsizer XT (Retsch Technology GmbH, Germany). The technique of digital image analysis is based on the computer processing of a large number of sample's pictures taken at a frame rate of 277 images/seconds by two different cameras, simultaneously.

This technique is used to measure a particle size distributions of the inventive particles.

Apparent Density

The apparent density of powders was measured by Accupyc 1330 Pycnometer (Micrometrics Instrument Corporation, US). The instrument determines density and volume by measuring the pressure change of helium in a calibrated volume.

Tapped Density

The tapped density is measured by STAV 2003 jolting volumeter (J. Engelsmann, AG, Germany). The powder is poured into a 250 ml cylinder, weighted, and tapped 100 times with the instrument. The volume and weight are then measured and used to calculate the tapped density.

Matrix Density

The matrix density was determined by DMA 4500 M (Anton Paar, Switzerland AG). The sample is introduced into a U-shaped borosilicate glass tube that is excited to vibrate at its characteristic frequency, which depends on the density of the sample.

EXAMPLES

The following examples are illustrative of the products and methods of making the same falling within the scope of the present invention. They are not to be considered in any way limitative of the invention. Changes and modifications can be made with respect to the invention. That is the skilled person will recognise many possible variations in these examples covering a wide range of compositions, ingredients, processing methods and mixtures and can adjust the naturally occurring levels of the compounds of the invention for a variety of applications.

Example 1

Preparation of the Amorphous Particles of the Present Invention

| Ingredients | Amount (wt %) |
| --- | --- |
| water | 44.9 |
| Sucrose | 21.9 |
| Bulking agent (skimmed milk powder) | 33.2 |

All ingredients were weighed separately and then mixed at room temperature until full dissolution. After a preheating at 85 deg C. for 22 s, the solution is spray-dried using a one-stream closed-top spray drier according to the parameters listed in the table below:

| Spray-drying parameters | |
| --- | --- |
| Nozzle | 4 × Schlick nozzle, 0.7 mm -70° spray angle mounted on a central multi-head |
| Inlet air temperature | 110 deg C. |
| Output temperature | 77-80 deg C. |
| Pump pressure | 250 bar |
| Gas injection | 0 NL/min |
| Output | 650 kg/h-750 kg/h |

The particles had a D90 of 61.6 microns, a D50 of 38.4 microns, a D10 of 20.4 microns, a water content of 2.99%, a glass transition temperature of 46.83° C., sphericity of 0.864 and a closed porosity of 14.67.

In respect of particle size distribution, the content of particles having a size of less than 10 microns was 4%.

The particles were found to be one continuous phase of amorphous material using cryo-SEM.

A Standard Reference Formulation for a Chocolate Recipe

| Ingredients | Amount (wt %) |
| --- | --- |
| Sugar | 46.47 |
| Whole milk powder | 23 |
| Cocoa liquor | 11 |
| Cocoa butter | 19 |
| lecithin | 0.5 |
| vanillin | 0.03 |

A standard process for the preparation of chocolate was employed. All dry ingredients and about 26% of cocoa butter fat is heated at 45 deg C. for 3 mins. After mixing, the resulting paste is passed through a two roller refiner and a five roller refiner to produce flakes with particle sizes ranging between 50 and 55 microns.

After refining, the mixture comprising the refined mass is mixed with the rest of the fat and lecithin to liquefy it at 45 deg C. for 3 mins.

Example 2

A reduced sugar chocolate composition was prepared as follows: sugar, skimmed milk powder, and cocoa liquor are heated at 45 deg C. for 3 mins. After mixing, the resulting paste is passed through a two roller refiner and a five roller refiner to produce flakes with particle sizes ranging between 50 and 55 microns.

After refining, the mixture comprising the refined mass is mixed with the amorphous particles, cocoa butter, vanillin and lecithin to liquefy it at 45 deg C. for 3 mins.

| Ingredients | Amount (wt %) |
| --- | --- |
| Amorphous Particle | 29.00 |
| Sugar | 15.70 |
| Skimmed milk powder | 6.80 |
| Cocoa liquor | 23.3 |
| Cocoa butter | 20 |
| lecithin | 0.52 |
| vanillin | 0.02 |

Example 3

A reduced sugar chocolate composition was prepared as follows. Sugar, skimmed milk powder, cocoa mass and milk fat are heated at 45 deg C. for 3 mins. After mixing, the resulting paste is passed through a two roller refiner and a five roller refiner to produce flakes with particle sizes ranging between 50 and 55 microns.

After refining, the mixture comprising the refined mass is mixed with the amorphous particles, cocoa butter, vanillin and lecithin to liquefy it at 45 deg C. for 3 mins.

| Ingredients | Amount (wt %) |
| --- | --- |
| Amorphous Particles | 28.0 |
| Sugar | 19.5 |
| Cocoa mass | 25.3 |
| Cocoa butter | 10.5 |
| Skimmed milk powder | 7.3 |
| Milk fat | 7.9 |
| lecithin | 0.005 |
| vanillin | 0.0002 |

Comparative Example 1

Preparation of Comparative Amorphous Porous Particles:

| Ingredients | Amount (wt %) |
| --- | --- |
| water | 50 |
| Sucrose | 35 |
| Skimmed milk powder | 15 |

All ingredients were weighed separately and then mixed with a polytron PT3000D mixer until full dissolution at room temperature with a speed rate between 6000 and 12000 rpm. The inlet solution is transferred in a vessel at controlled temperature of 55° C. and is then pumped at 100-130 bar. After a pre-heating at 60 deg C., the solution is spray-dried using a one-stream closed-top spray drier according to the parameters listed in the table below:

| Spray-drying parameters | |
| --- | --- |
| Nozzle | Alphanumeric (diameter 0.35 mm) |
| Inlet air temperature | 120 deg C. |
| Output temperature | 85 deg C. |
| Drying air volume | 400 m3 |
| Pump pressure | 130 bars |
| Gas injection | 0 NL/min |
| Solution flowrate | 12 L/h |

The particle size distribution D90 was 40 microns and the porosity was 6%.

Example 4

The chocolates of Examples 2 and 3 were informally tasted by a panel of 15. There was no reported loss in sweetness with an improved delivery of smooth melting.

Example 5 and Comparative Example 2

Fat-based fillings were prepared using the particles of the present invention prepared by Example 1 and the commercially available soluble dietary fibre Nutriose®, which is sold as a sugar replacement agent.
The Fillings were Encased in a Standard White Chocolate Recipe A fat-based confectionery filling was prepared according to the recipe given in the table herebelow:

| Ingredients | Amount (wt %) |
| --- | --- |
| Nutriose ® | 22.9 |
| Skimmed milk powder | 36.2 |
| sugar | 3.6 |
| fat | 36.9 |
| emulsifier | 0.4 |

A further filling was prepared according to the recipe given in the table herebelow:

| Ingredients | Amount (wt %) |
| --- | --- |
| Nutriose ® | 18.9 |
| Amorphous Particles | 9.2 |
| Skimmed milk powder | 34.4 |
| sugar | 0.0 |
| fat | 37.1 |
| emulsifier | 0.5 |

Process

The traditional filling is prepared using a conventional process of mixing together all dry ingredients and part of the fat (Chocofill NH30) and then refining using conventional roll-refiners to produce the preferred particle size in the range of 25 to 55 microns. The remainder of the fat is added to the refined mixture and further mixed to obtain a depositable or layerable filling composition.

A standard white chocolate was prepared and melted. A moulding plate is moved along a conveyor. Each mould is filled to overflowing with the chocolate flowable material, following which it is inverted in order that excess chocolate may be discharged. On reverting the mould plate to its upright position, a shell of chocolate is left on the bottom and sides of the mould.

Excess chocolate is scraped off the top of the mould plate. The filling composition is cooled to between 31° C. to 32° C. before being charged into the mould, which is vibrated to distribute the filling over the chocolate at the bottom of the mould. Further flowable chocolate material is charged onto the top of the filling, and the mould plate again vibrated to cause the top layer of chocolate to bed down. Excess chocolate is scraped off to form the back of the shelled product. The mould is cooled and then inverted to remove the formed chocolate-shelled product. The product weighs 5 g.

The product was tasted by a tasting panel of 14 professional panellists with 2 samples each. The panel was trained following a standard Quantitative Descriptive Analysis procedure on a standard sensory glossary used for white chocolates gathering both Flavor and texture attributes.

During the evaluation of each sample, the panellists were instructed to rate the intensity of each attribute presented in the sensory glossary. The perceived magnitudes were recorded on visual analog structured scale varying from 0 to 10 and the samples were presented in a monadic way (one at a time) to the panellists. In order to avoid saturation effect, a maximum of 3 products were evaluated for each single session with 5 minutes pause between the samples during which panellists were provided with freshly opened Acqua Panna water as palate cleaner. Monadic profiling data were collected using Fizz software (Biosystèmes, France) in individual sensory booths. An analysis of variance (ANOVA, two-way, Product fixed and Judge random) was performed for each sensory attribute to determine whether there are some significant differences among products. In addition, a Fischer's LSD multiple paired comparison has been applied to identify the products that are different from each other.

The trial with the particles of the present invention was found to be significantly less sticky (i.e. the extent to which the product sticks to the teeth during biting and chewing or during movement in the mouth). The similar properties of pastiness (the degree to which the sample turns into a paste that is difficult to dissolve and remove) and mouth coating (the extent to which a feeling of fat coating in the mouth) were also lower for the present invention—all contribute to the perception of "clagginess". However, the present invention also had higher sweetness, milk and vanilla flavours.

Hence, the present invention affords an improvement in organoleptic properties, which are a common problem in sugar replacement in confectionery, i.e. mouthfeel, without a loss in the positive attributes associated with confectionery. It is considered that the combination of particle size distribution, most preferably the reduction in particles of less than 10 microns, and porosity provides this.

The invention claimed is:

1. Amorphous particles comprising sugar and a bulking agent, wherein the amorphous particles have a closed porosity of less than 20% and a D90 particle size of greater than 45 microns, wherein lower than 25% of the amorphous particles have a particle size of less than 10 microns.

2. The amorphous particles according to claim 1 in which the closed porosity is between 2.5% and 18%.

3. The amorphous particles according to claim 1 in which the D90 particle size of the amorphous particles is above 50 microns.

4. The amorphous particles according to claim 1, wherein the amorphous particles have one continuous phase.

5. The amorphous particles according to claim 1, wherein the amorphous particles contain no more than 10% by weight of crystalline content.

6. The amorphous particles according to claim 1 in which the amorphous amount of particles have a closed porosity of less than 10%.

7. The amorphous particles according to claim 1 in which the amorphous particles comprise sucrose and skimmed milk, wherein the sucrose is present at a level of at least 30%, and the ratio of sucrose to skimmed milk is between 0.5 to 1 and 2.5 to 1 on a dry weight basis.

8. A food product comprising amorphous particles comprising sugar and a bulking agent, wherein the amorphous particles have a closed porosity of less than 20% and a D90 particle size of greater than 45 microns, wherein lower than 25% of the amorphous particles have a particle size of less than 10 microns.

9. The food product according to claim 8 wherein the food product is a fat based confectionery product.

10. A process of making amorphous particles comprising sugar and a bulking agent, wherein the amorphous particles have a closed porosity of less than 20% and a D90 particle size of greater than 45 microns, the method comprising:
    subjecting a mixture comprising the sugar and the bulking agent to a pressure of 200 to 300 bar; and
    spraying and drying the mixture to form the amorphous particles, wherein lower than 25% of the amorphous particles have a particle size of less than 10 microns.

11. The process according to claim 10 wherein the drying is spray-drying.

12. The process according to claim 10 wherein no gas is added during the process.

13. The process according to claim 10, wherein the pressure to which the mixture is subjected is 215 to 275 bar.

14. The amorphous particles according to claim 1, wherein the amorphous particles have a D50 particle size between 20 and 120 microns, and/or a D10 particle size between 5 and 50 microns.

\* \* \* \* \*